US005845784A

United States Patent [19]

Gray et al.

[11] Patent Number: 5,845,784

[45] Date of Patent: Dec. 8, 1998

[54] JAM RESISTANT CHANNEL SLIDE FOR SORTING MACHINE

[75] Inventors: Calvin G. Gray, Houston; Dale A Svatek, Needville, both of Tex.

[73] Assignee: Satake USA Inc., Houston, Tex.

[21] Appl. No.: 740,245

[22] Filed: Oct. 25, 1996

[51] Int. Cl.[6] .............................. B07C 5/00; B65G 11/16

[52] U.S. Cl. .......................... 209/577; 209/580; 209/581; 209/582; 209/639; 193/33; 193/34

[58] Field of Search .................................... 209/577, 580, 209/582, 639; 193/2 R, 33, 34

[56] References Cited

FOREIGN PATENT DOCUMENTS

| | | | |
|---|---|---|---|
| 186259 | 7/1986 | European Pat. Off. | 209/580 |
| 31605 | 2/1987 | Japan | 193/2 R |

OTHER PUBLICATIONS

ESM International Inc. Drawing No. 465712, Sheets 2, 3 and 4. Dated respectively, Apr. 26, 1995, Apr. 21, 1995, and Apr. 26, 1995. Sheet 1 is a cover sheet not showing any structures.

*Primary Examiner*—William E. Terrell
*Assistant Examiner*—Mark Deuble
*Attorney, Agent, or Firm*—Vaden, Eickenroht & Thompson, L.L.P.

[57] ABSTRACT

A multiple channel gravity-fed slide for a sorting machine is disclosed wherein the heights of the divider ribs between channels are at least high enough to define the channels and keep normally sized products flowing within the respective channels. At least some of the dividers or ribs have a tall height for supporting a product guide or keeper to provide some singulation and order to the products in the respective channels while allowing oversized and misshapen items to overlap into adjacent channels, thereby minimizing jamming of one or more channels.

12 Claims, 2 Drawing Sheets

JAM RESISTANT CHANNEL SLIDE FOR SORTING MACHINE

BACKGROUND OF THE INVENTION

1. Field of the Invention

This invention pertains to a multi-channel slide for a sorting machine and more particularly to such a slide for handling high volume products, some with color defects, mixed with foreign objects and/or products of irregular size and/or shape from the vast majority of products subject to being sorted.

2. Description of Prior Art

A typical sorting machine of the type utilizing the present invention can be characterized as a gravity-fed channel sorter. Such a sorter incorporates a slide or chute at a steep angle having multiple channels across its width. A hopper or other feed system is positioned for dispensing its product to the top of the slide. The slide is divided into multiple channels across its width and is further configured so that an approximately evenly proportioned number of dispensed products are directed to each of the channels. Such techniques of establishing each channel with the proper amount of the overall product that is totally dispensed onto the slide is well-known in the art. A typical sorter slide has numerous channels that may number as high as 64 or more, although slides for many machines in service today have only a limited number of channels, like 8.

Gravity slide sorters have been in use for many years, sorting a wide variety of food products and many non-food products as well. Early sorters were single channel units, with a "U" or "V" shaped slide conveying product to a viewing area. Later, larger sorters were developed with 2, 6, 8, 12, etc., individual slides on a single frame. These individual slides were similar to the slides used on the single channel units, but economies were gained by constructing multiple slides on a single frame. These sorters presented multiple linear streams, or "strings", of product to be viewed.

In the early 1980's, in response to the need for higher capacity sorters and to the need to sort products which would not flow smoothly down a slide, flat belt sorters were introduced. These sorters presented a wide sheet of product to the viewer.

In the mid-1980's a type of sorter was introduced which combined the simplicity and space efficiency of the discreet channel sorter with the high throughput capability of the belt sorter. These "broad Slide" sorters presented multiple flat streams of product to the viewer. The total throughput of these multiple flat streams was often equal to the throughput of competing belt sorters.

Early applications of this type of sorter were primarily in cereal grains such as rice. It has recently been demonstrated that this type of sorter can be applied to a variety of other products such as tree nuts, ground nuts, beans, etc., which had previously been sorted on smaller discreet slide sorters or on belt sorters. With this expansion of the application of broad slide sorters, several technical challenges have arisen concerning the design of the overall slide arrangement and the design of the configuration of each individual channel used on a broad slide sorter.

The purpose of a channel is to accelerate and singulate the product, and to present it uniformly into the viewing area. As further background on the current situation, design details of earlier broad slide and discreet slide or chute systems which allow them to accomplish their purposes need to be understood. First, broad slide chutes currently in use can be separated into two categories: undivided and divided. Second, for optimum sorting of certain types of products on discreet slide chutes, it was discovered long ago that a product guide across the top of a chute was desirable to stabilize product flow in the chute of the discreet slide sorter. Such a product guide is also known as a "keeper".

Regarding slide types, successful sorters have been developed for cereal grains using wide, flat slides, which present a "sheet" of product to the viewer/ejector system. This is similar to the product presentation of the belt sorter. Other successful sorters have been developed using slides that are also wide and flat, but in addition, have a series of dividing ribs separating the sheet of product into a series of "ribbons" of product, one per channel. These "ribbons" are presented to the viewer/ejector system oriented so that each ribbon passes in front of only one ejector. This important feature eliminates the condition of a defective product or article passing through the viewer in a location that causes two adjacent ejectors to fire at the same product, which often ejects an excessive amount of acceptable product along with the unacceptable. Logically, by eliminating the condition of product flowing through the zone of more than one ejector, a slide divided into channels, as just described, results in fewer total ejector fires and the removal of less good product. The innovation described below can be applied to both undivided and divided slide sorters, but the advantages of aligning ribbons of product flow with slide ejectors make the divided slide system more attractive. This difference is made even more significant as the sorter is applied to products larger than cereal grains or to highly contaminated product flows.

Product guides or "keepers" have been used for many years to control bounce and tumbling on a slide and within the channels of discreet slide sorters. Such a guide, usually a thin, flexible, plastic strip, is placed in the U-channel above the product flow. The width of the strip is selected so that it rests on the sides of the channel, allowing the product to flow freely under it. However, the strip remains near the product so that if the product bounces up, or if product is riding one on top of another, the products are forced back down to flow evenly in the bottom of the channel.

As a result of more product applications outside the cereal grain area being tested on broad slide sorters, it has become clear that product handling improvements are needed to maximize the performance of the sorter. To stabilize product flow when sorting larger products such as lentils or plastic flakes, the height of the dividing ribs of the chute has been extended. For round or oblong products such as nuts and beans, the bottoms of the channels in the multiple channel slide, instead of being flat, have been formed in a radius. For both the flat and radiused channels, the selection of a particular slide is determined by the size and shape of the product being sorted. The objective is to match the size of the channel to the size of the product so that it flows smoothly without excessive bounce, but is not slowed by running too tightly in a channel.

For most products, it has been found that a form of the traditional "keeper" improves product flow. A thin plastic sheet, in this case across the full width of the slide and resting on the tops of the dividing ribs, is used to keep product flowing smoothly in the bottom of the channels.

Such slides have been operated with some success on a variety of products. However, it has been found that performance is limited by oversized and/or irregularly shaped pieces in the product flow, which can cause product jam in a channel.

It has been found that the optimum channel configuration for many applications is to modify the dividing rib arrangement as described above, by reducing the height of every other rib. This modification allows the majority of the product flow to be controlled by the respective channels, as it would be if all ribs were in is place, achieving the objective of oriented product flow so that each ribbon of product passes in front of only one ejector. However, if a large piece of product or a piece of foreign material or a misshapened product that overhangs a divider rib is fed into a channel, instead of being jammed in the channel and disrupting product flow, it can “overflow” into the adjacent channel and is passed through the sorter.

The selection criteria for the channel configuration remains to match the channel profile to the shape of the product being sorted, but to use only alternating “dividing ribs” of full height to support the “keeper” strip. Full or tall height dividing ribs occurring at every third divider rib position, or even less frequently, could be used to support the keeper, if desired.

The essence of the proposed patent application is an optimum gravity slide configuration that comprises multiple channels with dividing ribs and a product control guide, or keeper that rests on top of the dividing ribs. The slide profile is defined by (1) the shape (either flat or one of several radius sizes) of the bottom of the channels, selected to match the product being sorted; (2) the height of the taller dividing ribs, selected to locate the keeper at the correct height; and (3) the height of the shorter dividing ribs, selected to be as low as possible so that oversized particles do not jam any of the channels while still controlling the majority of the product to flow within the individual channels. The improvement in product control is achievable by applying a keeper to a slide with ribs, the only purpose of which is to support the keeper, the channel locations being independent of the ejectors. However, optimum benefit is achieved by having the ejector for the channels positioned in line with each other across the slide. This allows two adjacent ejectors to fire together when there is a product or foreign object that spans at least partially across two respective adjacent channels so as to remove such product or object from the product flow.

Therefore, it is a feature of the present invention to provide an improved slide for a sorter that is divided into multiple channels for separate viewing and ejecting of sorted products that is constructed in such a way to be jam resistant.

It is another feature of the invention to provide an improved multiple channel slide and guide combination that allows oversized and irregularly shaped products and foreign objects to overlap into an adjacent channel without sticking or jamming in a channel.

It is still another feature of the present invention to provide an improved multiple channel and ejector combination that allows oversized and irregularly shaped products and foreign objects to overlap into one or more adjacent channels, so as to be detected for ejection, and to be ejected by the simultaneous firing of two side-by-side adjacent ejectors correspondingly positioned with respect to the respective adjacent channels.

SUMMARY OF THE INVENTION

An illustrated preferred embodiment of the invention pertains to a slide for a gravity fed sorting machine. The slide is divided into multiple channels for separate viewing and ejection sorting action. The slide is positioned for use by being established at a large angle to the horizontal. Product to be sorted is deposited from a hopper or otherwise, directed to the various channels, and to slide down them. Each channel may be flat- or radius-bottomed, as desired, and is separately viewed in an electro-optical viewing station so that an ejector aligned with the channel and downstream from the viewing station fires to remove nonstandard or defective products or other objects. The dividing ribs between channels are at least as high as to ordinarily keep the products from transferring from one channel to the next. Every other rib or every third rib has a taller height and provides the support for a normally plastic guide or keeper that lays across the top of the slide to prevent products from excessive bouncing or “piggyback” stacking.

A product or foreign object that is larger than a regular product, or is misshapen, can overlap an adjacent dividing rib and remain under the guide or keeper. This allows the irregular product or foreign object to pass freely without jamming or blocking a channel.

By aligning the viewing stations and related ejectors at a corresponding position across the slide, the ejectors also being aligned opposite an ejector opening in the slide, the detection of the irregular product or foreign object in two adjacent channels will cause both of the corresponding ejectors to fire and to thereby remove the irregular product or foreign object, even when it is heavier than ordinary.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the exemplary embodiments thereof that are illustrated in the drawings, which drawings form a part of this specification. It is to be noted, however, that the appended drawings illustrate only typical preferred embodiments of the invention and are therefore not to be considered limiting of its scope as the invention may admit to other equally effective embodiments.

In the drawings.

DESCRIPTION OF THE PREFERRED EMBODIMENTS

Figure 1:
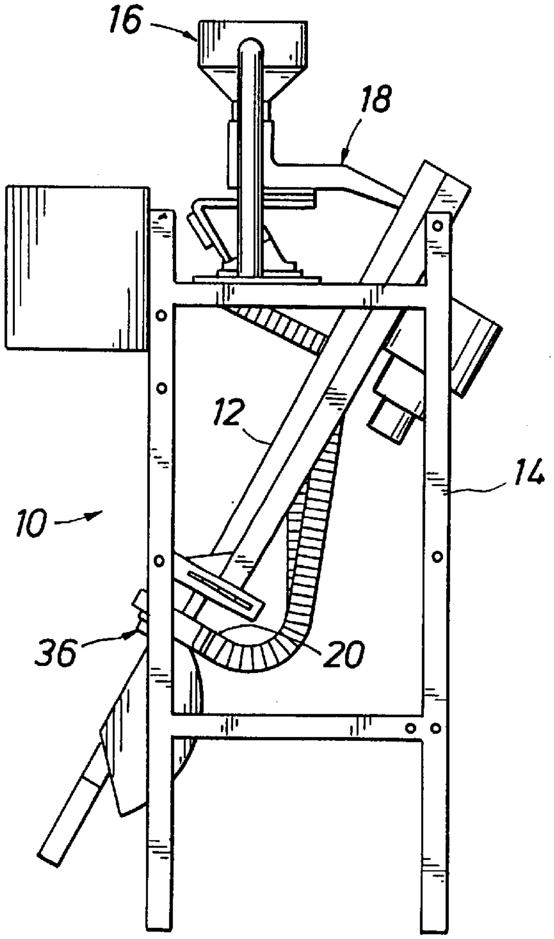
FIG. 1 is a side view of a gravity-fed sorter utilizing a slide in accordance with the present invention.

Now referring to the drawings, and first to FIG. 1, a high speed gravity-fed sorter for separating nonstandard fungible products or items from a passing stream or flow of such products is shown. Generally, machine 10 includes multiple channels across a slide 12. Slide 12 is established by the machine at a steep angle to horizontal, usually on the order of 60°. Slide 12 is held in its position by a framework 14. The gravity fed products to be sorted are fed from hopper 16, or otherwise, hopper 16 also being attached to framework 14 at its top so that the product feeds through a dividing vibratory feeder 18 to the channels on slide 12, preferably evenly distributing about the same number of products in each of the channels.

The products to be separated or sorted are small fungible items, such as coffee beans, rice grains, plastic shards, or the like. It will be appreciated that such products are readily individually identifiable and distinguishable by color or shade of color in one or more spectral bands. The feed from the hopper via the vibratory feeder and down the respective channels is all by gravity action. The flow of the products is only slowed from free fall by the friction caused by the bends and the surface of the respective channels. The products do move, however, at a fast rate and in large quantity, as is well known in the art.

An optical viewing station 20 is located along the slide at about the two-thirds position from the top. As the flow of products flows past the station, nonstandard or substandard products, as well as foreign objects, are sensed or detected. When a nonstandard product or a foreign object is sensed, an electrical signal is produced that results in an ejection of such product or object by an ejector 36 located in close proximity to the product stream and located at a predetermined distance beneath the viewing station. Typically, the ejector is a pneumatically operated nozzle that produces an air jet and is activated on by a controlled ejector valve a predetermined delay time after the item to be removed has been observed and detected in the corresponding viewing station. That is, an actuated electrical signal is produced in the viewing station electronics that, in turn, causes the expelling or removal of the nonstandard item from the product stream.

Figure 2:
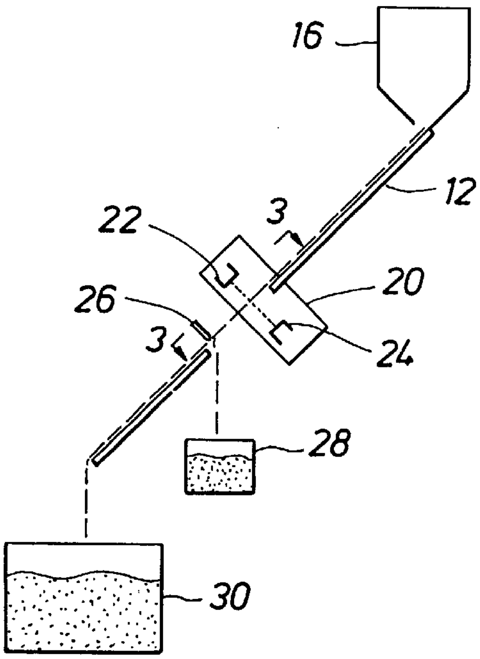
FIG. 2 is a schematic representation of product being sorted in a channel of a slide, the product stream passing through a viewing station for removing products and foreign objects subject to sorting in a collection bin apart from the bin for acceptable product.

FIG. 2 schematically shows the functioning of the related components of the sorting machine in schematic fashion. Products and foreign objects to be inspected and sorted are released from hopper 16 to the top of a channel on slide 12, possibly through intermediate means (not shown in FIG. 2). Alternatively, the gravity-fed source of the items to be sorted can be from a continuously operating conveyor belt or other automated conveyor means. The released items in the channel drop and tumble down the channel and are viewed through an opening gap in the channel at viewing station 20. Viewing station 20 includes a light source 22 that produces a light ray in the visual or nearby spectrum so as to reflect from the items and be detected by light detector 24. In an actual machine, the slide is configured, as more fully described below, to deliver the released items in a series of adjacent ribbons or channel streams of products. Detection typically occurs in either a single spectral band or in two spectral bands as developed in the viewing station by a separate optical viewer for each channel product ribbon. Alternatively, two opposed optical viewers are employed for each product ribbon. Viewing occurs in a viewing window where the product ribbon is aligned opposite the gap in the channel. In the scheme employing two spectral bands and two opposed viewers, nonstandard reflection in either band from either of the two light-source-and-detector combination produces an electrical signal pulse to actuate the channel ejector, as discussed above. In FIG. 2, this is ejector 26. Ejected products and foreign objects are deflected from the free-fall path through the open space in the channel so as to fall in bin 28, which is properly positioned for this purpose. Products that are determined to be standard or acceptable pass onto the lower part of the channel and eventually are dispensed off its end to be collected in receiving bin 30. For continuous operation, either or both the standard and sorted nonstandard products could be gathered instead on properly positioned continuously moving conveyor belts or other material handling means, if desired.

A slide 12 comprises a plurality of channels. Small machines may include a slide with as few as only two. Slides with six, ten and twenty channels are common. Larger machines may have upwards of 100 channels, but the operating principles as above described remain the same for each individual channel of the slide. That is, the product is observed or detected in an optical viewing station and the nonstandard and foreign objects are ejected therefrom by an activated ejector aligned with the channel. This is shown from another perspective in FIG. 3. Slide 12 is comprised for illustration purposes of eight channels 12*a*–12*h*. The upper part of slide 12 is separated from the lower part of the slide by gap 13, wherein the flow of products is observed in a viewing station for each respective channel (not shown in FIG. 3). Nonstandard products are removed by a properly positioned or aligned ejector 26, located near the bottom of the gap and just above the lower part of the slide. Since each channel operation is independent of every other channel operation, the firing or activation of a first ejector has no bearing upon the firing of the other ejectors.

Figure 4:
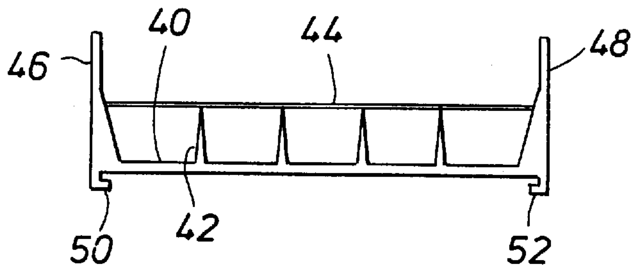
FIG. 4 (PRIOR ART)
FIG. 4 is an end view of a flat-bottomed multiple-channel slide in accordance with the prior art.
Figure 5:
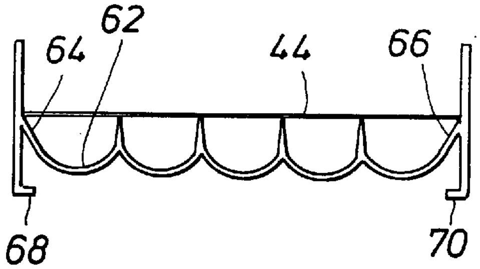
FIG. 5 (PRIOR ART)
FIG. 5 is an end view of a radius-bottomed multiple-channel slide in accordance with the prior art.

Now referring to FIGS. 4 and 5, end or cross-sectional views of slide construction are shown as they have been employed in the prior art. For convenience, five separate channels are shown for each of the slides. In an actual slide, there can be a fewer number or a much larger number of channels, as desired.

The slide configuration shown in FIG. 4 shows that bottom 40 of the respective channels is flat, which is probably the most economical slide construction. In addition, a flat-bottomed channel produces the least friction for common channel construction to a rounded product, such as a rice grain or a coffee bean. The channels are separated from one another by divider ribs 42, which are designed to be far enough apart to allow a sliding or tumbling product to pass between adjacent divider ribs regardless of orientation. The divider ribs are high or tall enough to prevent a single product from bouncing up and over to the next channel. Such a height in FIG. 4 is higher than the products that are being allowed to flow through the channels, since a guide or keeper 44 rests across the slide and rests on the divider ribs. A guide 44 typically is a plastic sheet of moderate rigidity. On either side of the slide are support rails 46 and 48 that are sloped or otherwise formed to provide a rib support on the outside of the adjacent outside channel.

The function of guide 44 is to minimize excessive bouncing of the product stream and to separate products that may become or try to become stacked from stacking so that the products move along the respective channels in at least somewhat singulated fashion. It is well-known that there are viewing techniques that can operate with respect to nonsingulated product flow, but guide 44 at least generally flattens out the flow of the products in the channels to promote nonambiguous detection. The feet of the outer rails are hooked inwardly at feet 50 and 52, respectively, for purposes of structural rigidity and mounting the slide to the frame of the sorter. Other means can be used for mounting, however, if desired.

FIG. 5 illustrates another commonly configured channeled slide. In this case, each of the channel bottoms 62 is curved or radiused to be compatible with the product being sorted. Being radiused does not mean that a channel necessarily conforms to a circle. A gentle "V" bottom channel is also popularly employed. The bottom curve is generally a little larger than the corresponding curve of the product being sorted when viewed at the end of its long axis. The curve is symmetrical about a center line, however, which is shown for the illustrated central channel. A 10 mm radius is a preferred channel dimension for use in sorting almonds. Channels with a 3–5 mm radius are used for beans (depending on expected bean size) and 1 mm radius half-round or "V" shaped channels are preferred for small seeds. The channels are separated by divider ribs, which may be continuous extensions of the respective radius bottoms. The ribs are high enough to promote singulation, as described above for a flat-bottomed slide, especially when employed to support a guide or keeper 44, as described above.

The side support rails are again configured to provide a support rest 64 and 66 for guide 44 and mounting feet 68 and 70, respectively, for rigidity and mounting purposes.

It is apparent that a product that is bigger than the opening provided by the dimensions enclosed by the divider ribs (or side rail), bottom and guide will probably lodge in the channel to which it is directed and necessitate shut down of the sorter while the channel is unclogged. Misshapen or irregular products that may not be bigger than the channel in several orientations, still will jam the channel when a larger-than-normal dimension bridges across the channel opening. Moreover, foreign objects that are shaped to cause bridging by either being generally oversized or configured so as to bridge will also jam a channel in a similar fashion.

Figure 6:
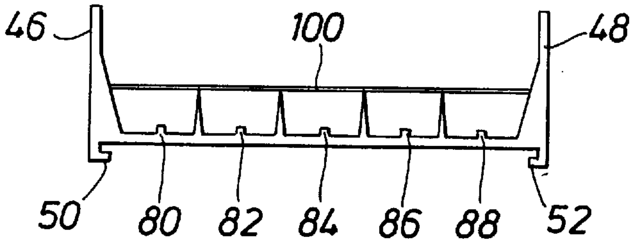
FIG. 6 is an end view of a flat-bottomed multiple-channel slide in accordance with the present invention, wherein every other divider rib is a tall height divider rib.

Now turning to FIG. 6, a ten-channel slide is shown having a flat bottom. Side rails 46 and 48 and feet 50 and 52 are the same as with the FIG. 4 prior art slide described above. However, unlike the prior art, every other one of the channel dividers or ribs 80, 82, 84 86 and 88 are of a height only high enough to keep the normal flow of products within a channel, which height is much less than the height of a normal product. However, dividers or ribs 90, 92, 94, 96 and 98 that are respectively interspersed with channel dividers 80, 82, 84, 86 and 88 have a height that is appreciably higher. These so-called tall height dividers provide the support for guide or keeper 100, which may be identical to guide 44. Ordinarily, the material for such a guide is a somewhat rigid plastic; however, other materials can be used, if desired. The guide-and-support arrangement allows a larger than normal or misshapen product or foreign object that would jam a same dimension channel of the slide shown in FIG. 4 to ride over divider 80, 82, 84 86 or 88 and to lap over into the adjacent channel without jamming the operations, since there is overlap room under the guide. The guide is still effective for minimizing bounce and unstacking or preventing the stacking of tumbling products.

It should be noted that an occasional product might bounce or be bumped to jump over the shorter dividers into the adjacent channel. No harm results since the inspection and sorting process is the same for each channel so no normal product is ejected and no nonstandard product or object goes undetected as being in need of ejection regardless of which channel a product is in when it undergoes viewing in a viewing station.

Figure 3:
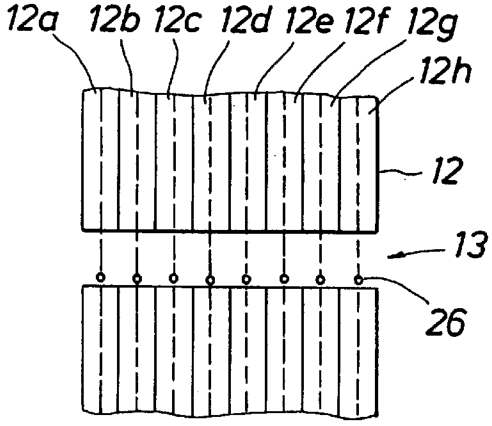
FIG. 3 is a partial front view of a multiple-channel sorting slide in accordance with the present invention and taken at line 3—3 of FIG. 2, showing the aligned position of ejectors for the respective channels.

It should be noted that since the detection of products in a channel determines the firing operation of the ejector for that channel, foreign objects that are detected are sometimes not ejected even if sized so as to squeeze through the channel because they create more friction than normal, which causes the ejector to fire before such foreign object is in position. Such condition is minimized by the inventive divider rib scheme described above since foreign objects are not squeezed but allowed to extend over a low divider rib into the adjacent channel, which does not slow its rate of descent. Moreover, a foreign object or product that causes an ejector activation and which is overlapped into an adjacent channel causes not just one ejector firing, but two, since it will be detected to produce an ejector signal for both channels. By having the ejectors at a corresponding position across the slide, as shown in FIG. 3, two ejectors that are aligned with the channels in which the simultaneous viewing and detection occurred, both fire together to remove the item to be ejected, whereas the firing of a single ejector may not have been enough for ejecting the oversized and possibly overweight item, be it product or foreign object.

Figure 8:
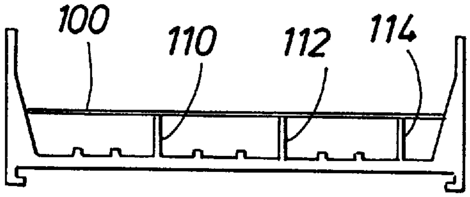
FIG. 8 is an end view of a flat-bottomed multiple-channel slide in accordance with the present invention, wherein every third divider rib is a tall height divider rib.

Referring to FIG. 8, a slide similar to the one shown in FIG. 6 is shown, except, every third divider or rib 110, 112 and 114 support guide 100, which allows an oversized item to overlap two adjacent channels to that of the original to avoid jamming. Simultaneous removal or ejection firing can result in as many as three adjacent ejectors to remove the nonstandard item.

Figure 7:
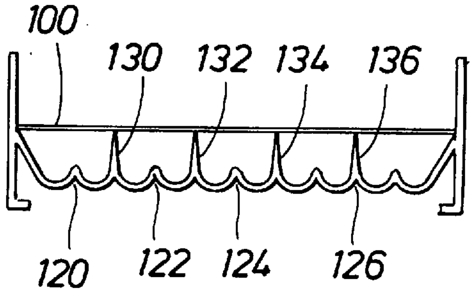
FIG. 7 is an end view of a radius-bottomed multiple-channel slide in accordance with the present invention, wherein every other divider rib is a tall height divider rib.

Referring to FIG. 7, a slide with radiused channels is shown, much like the channels of FIG. 5. However, every other divider or rib 130, 132, 134 and 136 are only high enough generally to maintain product flow in the respective channels, as previously discussed. The tall height dividers interspersed with dividers 130, 132, 134 and 136 support guide 100. Otherwise, the slide construction is similar to that of FIG. 5. An oversized or misshapen product will be allowed to pass under guide 100 and remain moving down the slide without difficulty.

Figure 9:
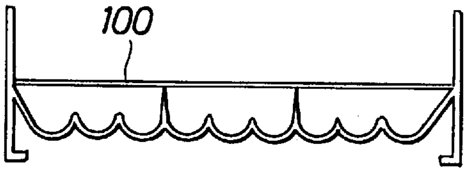
FIG. 9 is an end view of a radius-bottomed multiple-channel slide in accordance with the present invention, wherein every third divider rib is a tall height divider rib.

Finally, FIG. 9 is similar to FIG. 7 in that the channel bottoms are radiused as determined by the shape of the product in the product flow, except every third divider or rib is a tall height divider for supporting guide 100. However, as with the FIG. 8 embodiment, the fact that three adjacent channels are opened together under the tall dividers, an oversized or misshapened product or foreign object that spans up to three channels still will not cause jamming. Also, up to three adjacent or side-by-side and aligned ejectors can be actuated or fired simultaneously to remove the nonstandard item.

A tall height divider is preferably in the range of about two to eight times the height of the other dividers, six being a representative ratio. In one usable embodiment, the tall dividers are 12 mm tall and the short dividers are 2 mm tall. However, even a divider just slightly taller than the other dividers provides some benefit in reducing jamming.

While several preferred embodiments of the invention have been described and illustrated, it will be understood that the invention is not limited thereto, since many modifications may be made and will become apparent to those skilled in the art. For example, a two-channel slide may have only side supports for a product guide, the divider between the channels being low enough to permit irregular and/or oversized products and foreign objects to overlap into the other channel, as discussed above.

What is claimed is:

1. A slide for a gravity slide sorter, comprising at least two adjacent channels to allow separate sorting detection and ejection of products traveling therein by respectively aligned ejectors, a channel divider located between said adjacent channels at least sufficiently tall for maintaining the flow of products generally within the respective channels, support means for a product guide, and a product guide supported over said adjacent channels by said support means to permit a portion of oversized or irregularly shaped products and foreign objects to pass over said channel divider, said product guide contacting the products and foreign objects when the products and foreign objects become stacked one on top of another within said channels so that the products and foreign objects are kept under said product guide, thereby permitting uninterrupted flow of the products in each of said adjacent channels without either of said adjacent channels being jammed.

2. A slide for a gravity slide sorter, comprising a plurality of side-by-side channels to allow separate sorting detection and ejection of products traveling therein by respectively aligned ejectors, a plurality of channel dividers located between said respective channels, each of said dividers having a height along the length of its adjacent channels at least sufficient for maintaining the flow of products generally within the respective adjacent channels, some of said dividers having a tall height in excess of the others of said dividers, and a product guide supported by said tall height dividers to permit a portion of oversized or irregularly shaped products and foreign objects to pass over said other dividers, said product guide contacting the products and foreign objects when the products and foreign objects become stacked one on top of another within said channels so that the products and foreign objects are kept under said product guide, thereby permitting uninterrupted flow of the products being sorted without any of said channels being jammed.

3. A slide in accordance with claim 2, wherein the bottoms of said channels are flat.

4. A slide in accordance with claim 2, wherein the bottoms of said channels have a radius shape to conform to the shape of the products being sorted.

5. A slide in accordance with claim 2, wherein said tall height channel dividers are interspersed at regular intervals with said other dividers.

6. A slide in accordance with claim 5, wherein every other one of said dividers is one of said tall height dividers.

7. A slide in accordance with claim 5, wherein every third one of said dividers is one of said tall height dividers.

8. A slide in accordance with claim 2, wherein said tall height dividers are about six times the height of said other dividers.

9. A slide in accordance with claim 2, wherein said tall height dividers are between twice and eight times the height of said other dividers.

10. A slide in accordance with claim 2, wherein said tall height dividers are 12 mm tall and the other dividers are 2 mm tall.

11. In an electro-optical sorting machine for sorting a large quantity of products utilizing a multiple channel slide onto which are gravity fed the products, the sorting machine also including respective optical viewing stations commonly positioned with respect to the respective channels and channel-aligned ejectors respectively commonly positioned with respect to the channels downstream from the respective optical viewing stations, the improvement of a jam resistant slide and ejector means, comprising said jam resistant slide having a plurality of side-by-side channels subject to separate sorting detection and ejection of products traveling therein by respective channel-aligned ejectors, a plurality of channel dividers located between said respective channels, each of said dividers having a height along the length of its adjacent channels at least sufficient for generally maintaining the flow of products within the respective adjacent channels, some of said dividers having a tall height in excess of the others of said dividers, and a product guide supported by said tall height dividers to permit a portion of oversized or irregularly shaped products and foreign objects to pass over said other dividers, said product guide contacting the products and foreign objects when the products and foreign objects become stacked one on top of another within said channels so that the products and foreign objects are kept under said product guide, thereby permitting uninterrupted flow of the products being sorted without any of said channels being jammed; and said ejector means including the respective channel-aligned ejectors, adjacent ones of said ejectors simultaneously firing to eject an oversized or irregularly shaped product or foreign object detected within adjacent respective viewing stations associated with said adjacent ejectors.

12. A slide in accordance with claim 2, wherein said product guide is a planar sheet.

* * * * *